United States Patent
Rossin

(10) Patent No.: US 6,565,207 B1
(45) Date of Patent: May 20, 2003

(54) SPECTABLE FRAMES, UNALTERABLE AT DIFFERENT TEMPERATURES AND THE PROCESS FOR MAKING THEM

(75) Inventor: Paolo Rossin, Legnano-Milan (IT)

(73) Assignee: Optigen S.r.l., Legnano-Milan (IT)

( * ) Notice: Subject to any disclaimer, the term of this patent is extended or adjusted under 35 U.S.C. 154(b) by 0 days.

(21) Appl. No.: 09/743,345

(22) PCT Filed: Feb. 19, 1999

(86) PCT No.: PCT/IT99/00038

§ 371 (c)(1),
(2), (4) Date: Jan. 9, 2001

(87) PCT Pub. No.: WO00/05616

PCT Pub. Date: Feb. 3, 2000

(30) Foreign Application Priority Data

Jul. 20, 1998 (IT) .......................................... MI98A1665

(51) Int. Cl.⁷ ................................................. G02C 1/00
(52) U.S. Cl. .............................................. 351/41; 29/20
(58) Field of Search .............................. 351/41, 65, 111, 351/124, 126, 114, 158; 29/20; 364/560

(56) References Cited

U.S. PATENT DOCUMENTS 4,772,112 A 9/1988 Zider et al.
4,779,971 A 10/1988 Lhospice

FOREIGN PATENT DOCUMENTS

| EP | 0 338 586 | 10/1989 |
| EP | 0 648 856 | 4/1995 |
| WO | WO96/24086 | 8/1996 |

*Primary Examiner*—Hung Xuan Dang
(74) *Attorney, Agent, or Firm*—Hedman & Costigan, P.C.

(57) ABSTRACT

Spectacle frames having one or more components such as a bridge, nose rests and ear pieces of martensitic NiTi, NiTi nobium, NiTi iron alloy made by means of plastic deformation starting from a 20% work hardening raised by hammering up to 50% so that the final section of the material so treated maintains, within a range of temperatures from −50° C. to +70° C., sufficient elasticity and flexibility for adaptating the frames to the different facial forms of users.

8 Claims, No Drawings

SPECTABLE FRAMES, UNALTERABLE AT DIFFERENT TEMPERATURES AND THE PROCESS FOR MAKING THEM

BACKGROUND OF THE INVENTION

The invention concerns metal frames for spectacles.

FIELD OF THE INVENTION

Presently used techniques for making spectacle frames of NiTi alloys with a memorized shape, give the alloy a mild work-hardening treatment to facilitate processing, followed by heat treatment to memorize the shape and then further work-hardening to confer characteristics of elasticity in the range of temperatures at which the frames will be used, from −20° C. to +40° C.

A high rate of work-hardening would make the material fragile and it would then be impossible to obtain the complex forms needed for the spectacle frame components.

The above range of temperatures is in actual fact entirely inadequate. In very cold countries a temperature of −20° C. is normal and, generally speaking, in mountainous areas temperatures lower than −20° C. can be quite usual.

At 0° C. the NiTi alloy is already less rigid and loses much consistency. At a lower temperature the spectacle frames can be bent even with very little pressure.

On account of the memorized shape and extreme elasticity, difficulties are encountered in adapting the frames to the faces of different users. Purpose of this invention is to overcome the above drawbacks and provide further considerable advantages as will now be explained.

Subject of the invention are spectacle frames having one or more components, such as the bridge, nose rests and ear pieces made of work hardened martenistic NiTi, NiTi niobium, NiTi iron alloys.

BRIEF SUMMARY OF THE INVENTION

The components are made by plastic deformation starting from a 20% work-hardening of the alloy and then by hammering to reach about 50% making the ultimate section of the material, so stretched, sufficiently elastic and flexible, at temperatures ranging from −50° C. to +70° C., to make the frames adaptable to the different faces of users.

DETAILED DESCRIPTION OF THE INVENTION

The shape is given by plastic deformation; this involves using mechanical means to impress folds in the material, cooling it before the operation and keeping it at a constant temperature so that the folds become even.

In one advantageous type the titanium content of the alloy is between 43 and 47% by weight.

Said components are connected to the other parts of the spectacles by bushes fitted into the ends of said components.

The bushes are preferably of steel.

To check the effects and advantages of this process, tests were made in Italy by the National Research Council (CNR) at its institute of Metal Technology at Lecco.

During these tests great attention was paid to checking, at different temperatures, the mechanical properties of the ear pieces of the frames, comparing those available on the Italian market, the main feature of these ear pieces being their great elasticity.

Special care was taken in comparing:
an ear piece made by Optigen using the process here invented,
an ear piece on sale in the market made by the firm Heschenback.

The samples had uniform cross sections of about 1.2 mm in diameter. Diameters in actual fact were: Optigen 1.19 mm, Heschenback 1.27 mm. The surface layer was removed in a mild chemical bath.

Mechanical tests were made on the material using an MTS M/2 machine comprising a personal computer for checking the instruments and for acquiring data by means of specific software.

Tests were made at +50° C., +30° C., 0° C., −20° C., −40° C.

Each cycle consisted, for each charge, in checking stress up to 5%, and consequent release, in checking deformation to a value of "0".

This made possible an evaluation of residual stress after deformation avoiding overcompression of the ear piece.

After each test the sample was removed from the press and allowed to revert to residual deformation heating it up to about 80° C.

In this way the initial configuration could be fully recovered for the subsequent tests.

A comparison of the stress-deformation curves at 30°. for both samples shows a marked overall elasticity though there is a great-difference in the stress-deformation curve.

Behaviour of both samples shows a marked overall elasticity though there is a great difference in the stress-deformation curve, The Heschenback ear piece shows a certain recovery due to memory after deformation.

Behaviour of the Optigen sample is typically superelastic maintaining its plastic deformation.

In other words there is no evidence of martensitic transformation and related pseudoelastic behaviour.

When the stress-deformation curves of the same samples, at a temperature of −40° C., is compared, The behavior of the Heschenback sample is typical of a partially annealed material with marked recovery of imposed deformation but with residual pseudoplastic deformation.

Behaviour of the Heschenback sample is typical of a partially annealed material with marked recovery of imposed deformation but with residual pseudoplastic deformation.

This deformation may be easily recovered by simply heating the sample. After deformation the sample recovers its memorized shape.

Behaviour of the Optigen sample, on the other hand, is fully superelastic without any signs of martensitic transformation and pseudoplasticity. Residual plastic deformation of this sample is slight.

These initial results clearly show the entirely different behaviour of the two sample.

Both exhibit overall macroscopic elasticity and, after receiving a 5% deformation, can almost completely recover their initial shape. But the reason for this is totally different for the two arms.

Behaviour of the Heschenback sample is that of high elasticity combined with martensitic transformation; this takes place under stress in the shape-memorized NiTi alloys, is highly sensitive to temperature changes and ensures a low degree of tension in a wide range of deformations.

The Optigen product uses a different property of the NiTi alloy, namely its superelasticity.

The invention offers evident advantages.

The process produces spectacle frames that, without losing their elasticity, can be safely used at a much wider range of temperatures than can be obtained with other known processes, said frames being therefore utilizable at the temperatures prevailing in particularly cold countries or at high altitudes, including contact by the wearer with snow and ice.

Even at such low temperatures the frames maintain the characteristics of high flexibility and resistance for which they were chosen.

This has been unquestionably proved by tests carried out in CNR laboratories, at temperatures ranging from −20° C. to −40° C.; these tests prove that, even subsequent to that mechanical plastic deformation needed for making the component parts of the spectacles, the treated material always maintains its typically elastic properties.

Processes already known can produce frames which, using the same range of temperatures as indicated above, from −20° C. to −40° C., present plastic behaviour while maintaining their deformation.

It may also be noted that spectacle frames do not need to be superelastic since they are unlikely to encounter particularly high stresses in normal conditions of use.

On the other hand it must be possible to modify the ear pieces and/or the bridge to adapt them to the user's facial form.

In conclusion, a comparison between the frames produced by the above process and those made by others at present in use, shows that, though less elastic, these frames are always flexible enough to withstand stresses that would be sufficient to break them had they been made using presently-known processes; in addition, their characteristics remain unaltered at the different temperatures at which they are used, while they can be adapted to fit different facial forms and, once made, this adaption becomes stabilized.

What is claimed is:

1. A process for making spectacle frame components from martensitic alloys selected from the group consisting of NiTi, NiTi niobium and NiTi iron, said process comprising the steps of:

subjecting said martensitic alloys to a first plastic deformation operation with a 20% work hardening method other than hammering;

subjecting said martensitic alloys to a second plastic deformation operation with a 50% work hardening hammering method;

causing said spectacle frame components to have sufficient elasticity and flexibility at temperatures of from −50° C. to 70° C. to allow said components to adapt to a user's facial shape.

2. The process for making spectacle frame components as defined in claim 1, wherein the martensitic alloy comprises between 43 and 47% by weight of titanium.

3. The process for making spectacle frame components as defined in claim 1, wherein the components have bushes fitted into ends of said components for connection of the components.

4. The process for making spectacle frame components as defined in claim 3, wherein the bushes are made of steel.

5. A spectacle frame comprising components of work hardened martensitic alloys selected from the group consisting of NiTi, NiTi niobium and NiTi iron, said components having been subject to plastic deformation in the work hardened state, said components having been subjected to a 20% work hardening by other than hammering followed by a 50% work hardening with a hammering method, said components having sufficient elasticity and flexibility over a temperature range from −50° C. to 70° C. to adapt to a user's facial shape.

6. The spectacle frame as in claim 5, wherein the titanium content in the alloy is between 43 and 47% by weight.

7. The spectacle frame as in claim 5, wherein the components have bushes fitted at the ends of said components for connection of the components.

8. The spectacle frame as in claim 7, wherein the bushes are made of steel.

* * * * *